US009576417B2

(12) United States Patent
Christianson

(10) Patent No.: US 9,576,417 B2
(45) Date of Patent: Feb. 21, 2017

(54) ITEM PUSHER APPARATUS WITH CHANNEL-BASED SHUTTLE DISPLACEMENT DETECTION AND ASSOCIATED METHODS

(71) Applicant: Checkpoint Systems, Inc., Thorofare, NJ (US)

(72) Inventor: David P. Christianson, Charlotte, NC (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 265 days.

(21) Appl. No.: 13/937,471

(22) Filed: Jul. 9, 2013

(65) Prior Publication Data

US 2014/0008382 A1 Jan. 9, 2014

Related U.S. Application Data

(60) Provisional application No. 61/669,477, filed on Jul. 9, 2012.

(51) Int. Cl.
*G06F 11/00* (2006.01)
*G07F 11/38* (2006.01)
(Continued)

(52) U.S. Cl.
CPC ............... *G07F 11/38* (2013.01); *A47F 1/125* (2013.01); *G07F 9/026* (2013.01); *A47F 2010/025* (2013.01)

(58) Field of Classification Search
CPC .......... G07F 11/38; G07F 9/026; A47F 1/125; A47F 2010/025
(Continued)

(56) References Cited

U.S. PATENT DOCUMENTS

| | | | | |
|---|---|---|---|---|
| 5,730,320 A * | 3/1998 | David | G07F 11/40 | 211/59.3 |
| 7,347,335 B2 | 3/2008 | Rankin, VI et al. | | |

(Continued)

FOREIGN PATENT DOCUMENTS

| | | | |
|---|---|---|---|
| EP | 2000424 A2 | 12/2008 | |
| WO | WO 2014011618 A3 * | 3/2014 | G07F 11/38 |

OTHER PUBLICATIONS

Extended European Search Report and Written Opinion of corresponding European application No. 138159512, mailed Feb. 19, 2016.

*Primary Examiner* — Rakesh Kumar
(74) *Attorney, Agent, or Firm* — Nelson Mullins Riley & Scarborough, LLP

(57) ABSTRACT

According to some example embodiments, systems, apparatus, methods, computer readable media, and computer program products are provided for implementing an item pusher apparatus with channel-based shuttle displacement detection. One example method includes determining a position of a channel engagement member affixed to a shuttle, where the shuttle is movable and configured to at least exert a force on an item to urge the item towards a stopping member. The channel engagement member is configured to at least physically interface with as channel defined such that movement of the shuttle alone a defined movement path causes movement of the channel engagement member in a direction that is nonparallel to the defined movement path in at least one plane. Example systems apparatuses, methods, computer readable media, and computer program products are also provided.

20 Claims, 6 Drawing Sheets

(51) Int. Cl.
*G07F 9/02* (2006.01)
*A47F 1/12* (2006.01)
*A47F 10/02* (2006.01)

(58) Field of Classification Search
USPC .............................................................. 221/4
See application file for complete search history.

(56) References Cited

U.S. PATENT DOCUMENTS 7,792,711 B2* 9/2010 Swafford, Jr. .......... A47F 1/126 705/22
8,146,753 B2* 4/2012 Yuyama ............... A61G 12/001 211/59.3
8,190,289 B2* 5/2012 Lockwood .............. A47F 1/126 221/15
8,676,377 B2* 3/2014 Siegel .................... G06Q 10/08 221/4
8,941,495 B2* 1/2015 Wiese .................... G08B 13/08 211/59.2
9,129,494 B2* 9/2015 Valiulis ................... A47F 1/126
2003/0000956 A1* 1/2003 Maldonado ............. G07F 11/42 221/120
2005/0168345 A1* 8/2005 Swafford, Jr. .......... A47F 1/126 340/686.1
2005/0279722 A1* 12/2005 Ali .......................... A47F 10/00 211/59.3
2009/0048932 A1* 2/2009 Barber ................. G06Q 10/087 705/14.4
2009/0212065 A1* 8/2009 Templer .................. G07F 9/026 221/133
2009/0319399 A1* 12/2009 Resta ..................... G06Q 10/00 705/28
2010/0164337 A1* 7/2010 Yuyama ............... A61G 12/001 312/209
2010/0237093 A1 9/2010 Lockwood et al.
2011/0015781 A1* 1/2011 Vardaro .................. G07F 11/42 700/231
2011/0087369 A1* 4/2011 Bauer ....................... A47F 1/04 700/232
2011/0304316 A1* 12/2011 Hachmann .............. A47F 3/002 324/76.11
2012/0091162 A1* 4/2012 Overhultz ............... A47F 1/126 221/1
2014/0008382 A1* 1/2014 Christianson ........... G07F 11/38 221/4
2014/0299620 A1* 10/2014 Swafford, Jr. .......... A47F 1/126 221/4

* cited by examiner

ITEM PUSHER APPARATUS WITH CHANNEL-BASED SHUTTLE DISPLACEMENT DETECTION AND ASSOCIATED METHODS

CROSS-REFERENCE TO RELATED APPLICATIONS

This application claims priority to U.S. Provisional Application. No. 61/669,477, filed Jul. 9, 2012, which is hereby incorporated in its entirety by reference.

TECHNOLOGICAL FIELD

Various embodiments of the present invention relate generally to inventory and theft prevention technology, and more particularly, relate to an item pusher apparatus with channel-based displacement detection and associated methods.

BACKGROUND

As one might expect, retail product sales are detrimentally impacted by the products simply being unavailable to customers on the sales floor. In some instances, replacement stock may be as nearby as a stock room. However, store personnel may be unaware of out-of-stock conditions on the sales floor, and therefore shelves or other product displays can remain empty for extended periods of time and potential sales can be lost.

The issues involved in the availability of stock to customers on the retail sales floor are commonly referred to as On-Shelf Availability (OSA) issues. Some studies of OSA have shown that many customers will not choose a replacement product when their desired product is not available on the sales floor and those customers may even leave the store without making a purchase. Further, in some instances, customers may not return to the store if the out of stock conditions recur. As such, considering OSA issues and counteracting out-of-stock conditions on the sales floor can lead to improved sales and profits for retailers.

Additionally, retailers can suffer substantial financial losses as a result of retail theft. It is becoming increasingly common for shoplifters and thieves to implement organized and coordinated plans involving multiple individuals to steal large amounts of high priced goods from retail establishments. To protect against such losses, store owners have installed various systems that operate to deter theft through the use of alarms and other prevention mechanisms. However, as thieves become more sophisticated, theft deterrent systems may be circumvented by new techniques and equipment. As such, the technology used for theft prevention must continue to evolve to meet and exceed the increasing sophistication of organized theft techniques.

BRIEF SUMMARY

Some example embodiments of the present invention are therefore provided that detect the displacement of a shuttle of an item pusher via a nonparallel channel. According to some example embodiments, an example apparatus, possibly a item pusher, is provided that comprises a movable shuttle configured to at least exert a force on an tern stocked within the item pusher to urge the item towards a stopping member. The example apparatus may also include a channel surface oriented relative to a defined movement path for the shuttle where the channel surface includes a channel. Further the example apparatus may include a channel engagement member affixed to the shuttle where the channel engagement member is configured to at least physically interface with the channel. The channel may be defined such that movement of the shuttle along the defined movement path causes movement of the channel engagement member in a direction that is nonparallel to the defined movement path in at least one plane.

According to some example embodiments, an example method is also provided. The example method may comprise receiving a sensor signal from an output of a sensor where the sensor signal is indicative of a position of a channel engagement member. The example method may also include determining the position of the channel engagement member that is affixed to a shuttle. The shuttle may be movable and configured to at least exert a force on an item to urge the item towards a stopping member, and the channel engagement member may be configured to at least physically interface with a channel defined such that movement of the shuttle along a defined movement path causes movement of the channel engagement member in a direction that is nonparallel to the defined movement path in at least one plane.

According to some example embodiments, a non-transitory computer readable medium having computer program code stored thereon, where the computer program code is configured to, when executed, cause an apparatus to perform various functionalities, is also provided. The computer program code may be configured to cause the apparatus to receive a sensor signal from an output of a sensor where the sensor signal is indicative of as position of a channel engagement member. The computer program code may also be configured to cause the apparatus to determine the position of the channel engagement member that is affixed to a shuttle. The shuttle may be movable and configured to at least exert a force on an item to urge the item towards a stopping member, and the channel engagement member may be configured to at least physically interface with a channel defined, such that movement of the shuttle along a defined movement path causes movement of the channel engagement member in a direction that is nonparallel to the defined movement path in at least one plane According to some example embodiments, another apparatus may be provided. The apparatus may comprise means for receiving a sensor signal from an output of a sensor where the sensor signal is indicative of a position of a channel engagement member. The apparatus may further include means for determining the position of the channel engagement member that is affixed to a shuttle. The shuttle may be movable and configured to at least exert a three on an item to urge the item towards as stopping member, and the channel engagement member may be configured to at least physically interface with a channel defined such that movement of the shuttle along a defined movement path causes movement of the channel engagement member in a direction that is nonparallel to the defined movement path in at least one plane.

BRIEF DESCRIPTION OF THE SEVERAL VIEWS OF THE DRAWING(S)

Having thus described the various example embodiments of the invention in general terms, reference will now be made to the accompanying drawings, which are not necessarily drawn to scale, and wherein:

Figure 4A:
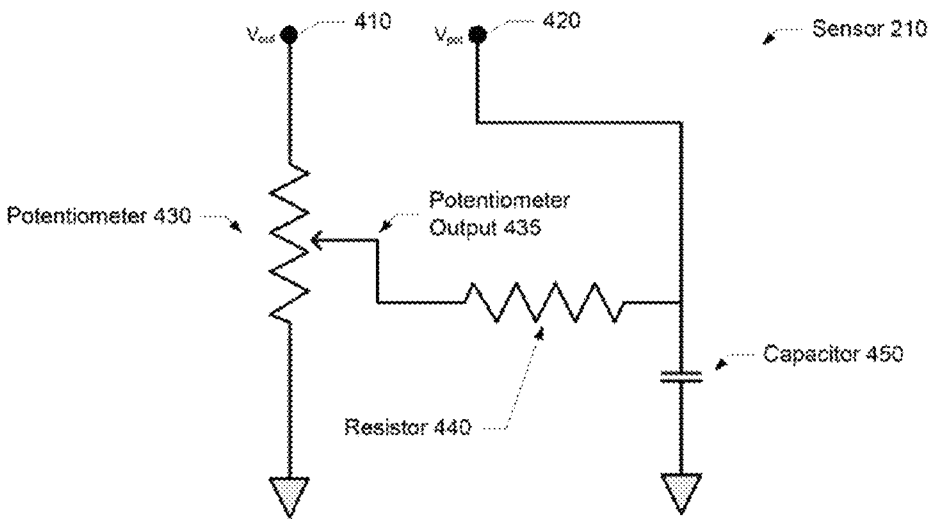
Figure 4B:
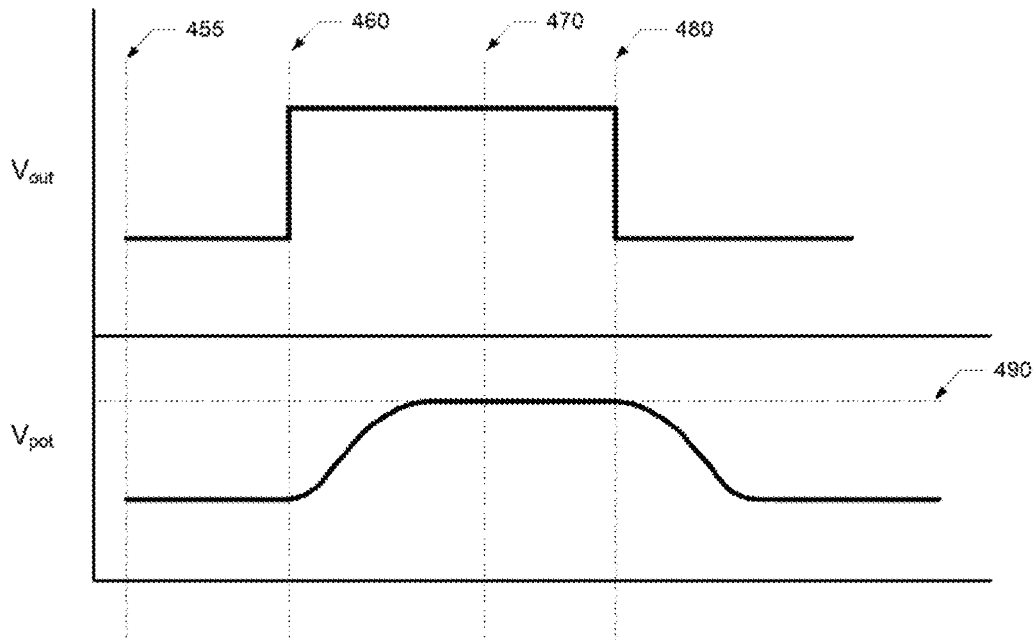
Figures 5A, 5B, 5C:
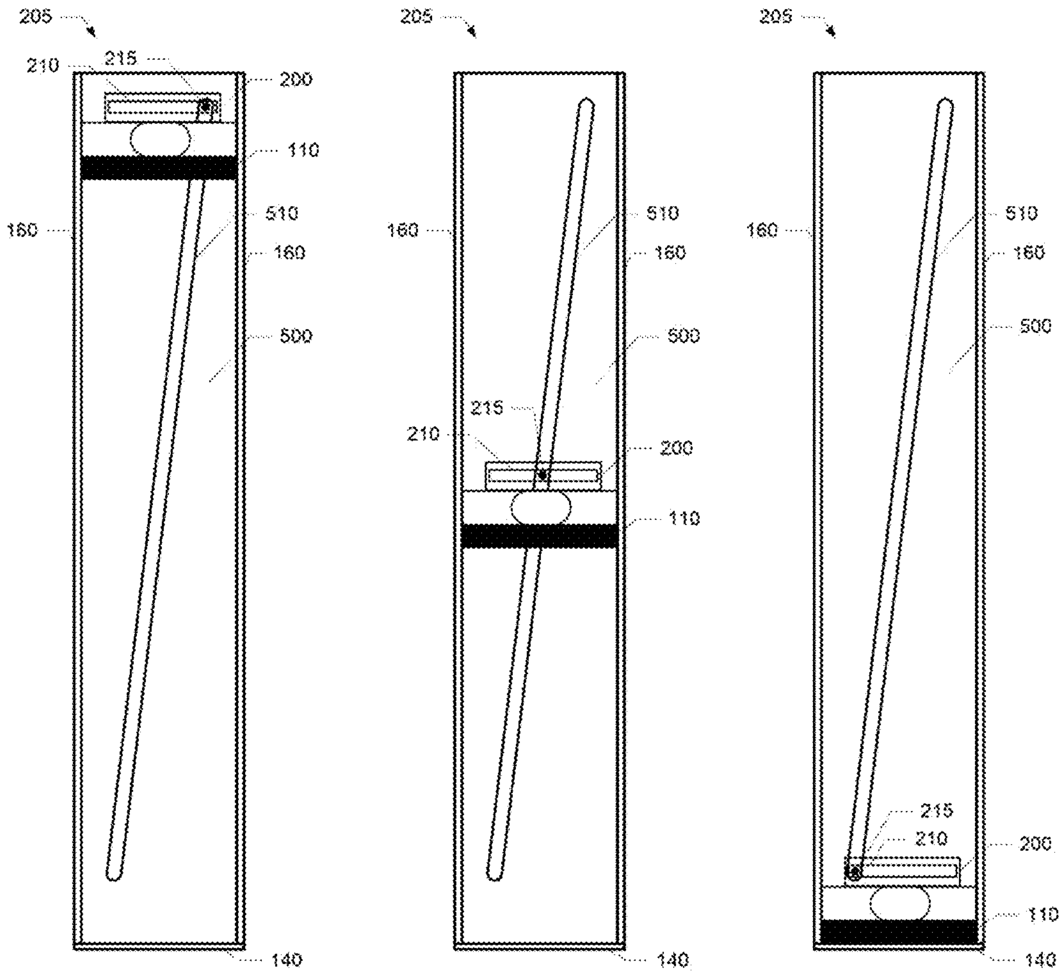
Figure 6:
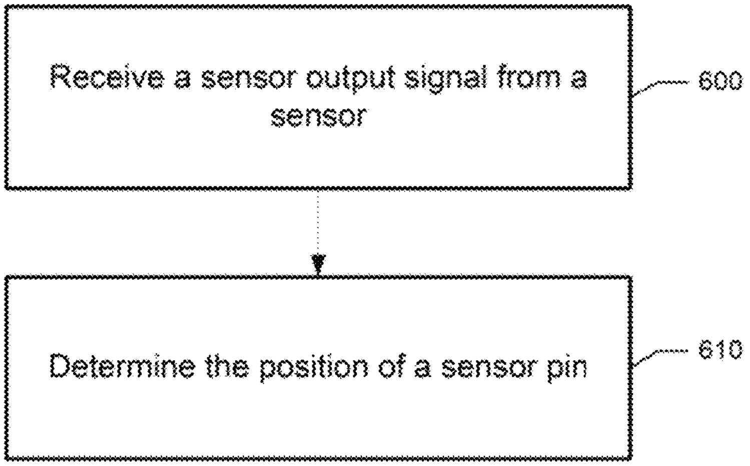

FIG. 4*a* is an illustration of an example sensor circuit according to some example embodiments;

FIG. 4*b* is in an illustration of example signals at various nodes of the sensor circuit of FIG. 4*a* according to some example embodiments;

FIGS. 5*a*-5*c* illustrate an overhead perspective of an item pusher including a channel engagement member that interfaces with a channel according various example embodiments; and FIG. 6 is a flowchart of an example method for detecting channel-based shuttle displacement according to various example embodiments.

DETAILED DESCRIPTION

Some embodiments of the present invention will now be described more hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As defined herein a "computer-readable medium" may encompass both transitory and non-transitory media. A "computer-readable storage medium" refers to a non-transitory medium, such as for example, a memory device. A "computer-readable transmission medium" refers to a transitory medium, such as, for example, propagating electromagnetic signals. Additionally, as used herein, the term "circuitry," such as, for example, within the context of "processing circuitry", refers to not only hardware-only circuit implementations including analog and/or digital circuitry, but also to combinations of hardware with corresponding software and/or instructions stored on a computer-readable storage medium.

Figure 1:
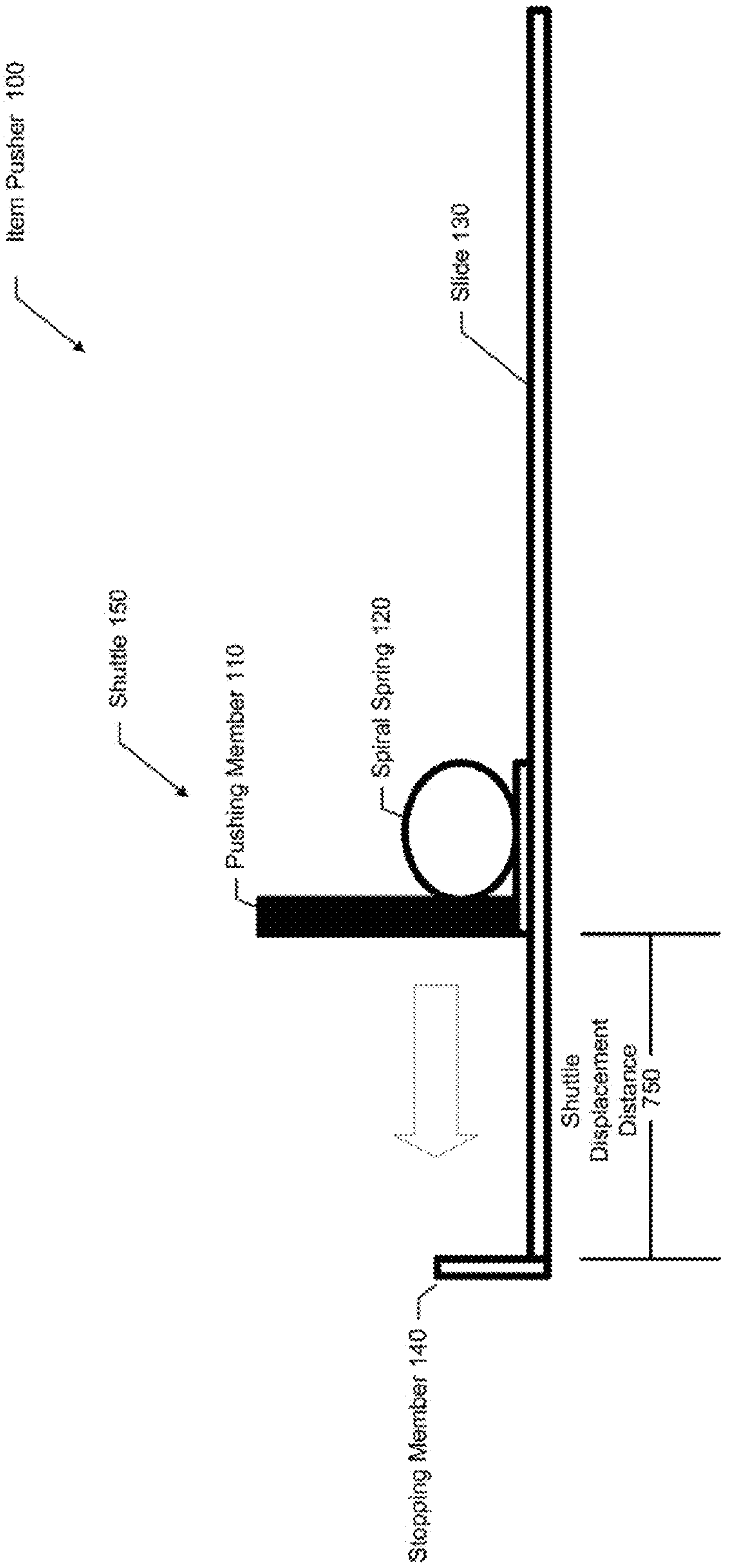
FIG. 1 is an illustration of an example item pusher according to some example embodiments.

Various example embodiments of the present invention may operate, and/or may be configured, to detect and respond to sales and theft activity associated with the use of an item pusher device. FIG. 1 illustrates an example item pusher 100 that may be used in combination with various example embodiments. While the item pusher 100 illustrates one type of item pusher device, one of skill in the art would appreciate that the various example embodiments of the present invention may be used in combination with a variety of item pusher-type devices.

The item pusher 100 may be part of as shelf or installed on as shelf in, for example, a retail store to display items (e.g., products for sale) that are stocked in the item pusher 100 for purchase by retail customers. Retail stores may utilize item pushers for a variety of reasons, however, one common reason for using item pushers is due to their "self-facing" capability, which provides customers with easy access to a item, even as the quantities in the item pusher are depleted because the items are continuously pushed into an accessible position to the front of the shelf). An item pusher may operate to continually force or push items to the front edge of the shelf, thereby providing maximum accessibility to the items while also maintaining item visibility. As a result of this item visibility aspect, item pushers tend to create an organized and clean display of items on a shelving unit that is attractive to customers.

To perform these and other functions item pushers, such as the item pusher device 100, may include a pushing member 110, a force exertion device (e.g., constant three spring, a spiral spring 120, or the like), a slide 130, and a stopping member 140 (e.g., a faceplate). Alternatively, some item pushers may use slide-less designs. The pushing member 110 may be a component of a movable shuttle 150 which may comprise the component or components that move along a defined movement path relative to the stopping member 140. The stopping member 140 may be any type of hardware (e.g., plastic, metal, etc.) that is fixed in place to counter the force being applied by the pushing member 110 and thereby stop motion of the items stocked in the item pusher 100 and motion of the pushing member 110. In this example apparatus, the shuttle 150 includes the pushing member 110 and the three exertion device (e.g., the spiral spring 120). As depicted in FIG. 1, the force exertion device—in this case the spiral spring 120—exerts a force on the shuttle 150 in the direction of the faceplate 140 because one end of the spiral spring is affixed to the slide 130 adjacent to the stopping member 140. It is contemplated that this force may be generated in a number of ways through, for example, the additional or alternative use of coil springs that either push or pull the shuttle 150 towards the stopping member 140. Further, in some example embodiments, the shuttle 150 may move along a declined plane towards the stopping member 140, and therefore gravity may generate or contribute to the three generated towards the stopping member 140. In this instance, the force exertion device may simply be the weight of the shuttle 150 which merely operates as a follower behind the stocked items and urges the items forward as a result of its weight. The force that is applied to the shuttle 150 would also be applied to an item that is placed in between the pushing member 110 and the stopping member 140. Therefore, the force provided by the shuttle 150, assuming a sufficient magnitude, would urge or push the item towards the stopping member 140 until the item rests against the stopping member 140.

The slide 130 may be configured to maintain the orientation of the shuttle 150 with the stopping member 140 as the shuttle moves along a defined movement path. As such, the slide 130 may be configured to guide the shuttle 150 along the defined movement path. According to some example embodiments, the pushing member 110 may move in substantially a straight line towards the stopping member 140 due to the orientation maintenance function performed by interaction between the shuttle 150 and the slide 130. To maintain the orientation of the shuttle 150 as the shuttle 150 moves along the defined movement path of the slide 130, tracks 160 (See FIGS. 5*a*-5*c*) along, the edges of the slide 130 may be used that prevent transverse movement of the shuttle 150 while permitting longitudinal movement towards and away from the stopping member 140.

When items are stocked into the item pusher device 100, the pushing member 110 is displaced from an out-of-stock resting position where the pushing member 110 would be located if no item is stocked into the item pusher device 100 (e.g., dictated by the stopping member 140). The displacement of the pushing member 110 from the out-of-stock resting position may be referred to as the shuttle displacement distance 750. As will be described in further detail with respect to FIG. 2, this shuttle displacement distance 750 may be determined and used to perform functionalities, such as item pusher stock inventory counting and theft sweep detection (e.g., detection of removal of a threshold number of items from the item pusher Within a threshold amount of time).

Figure 2:
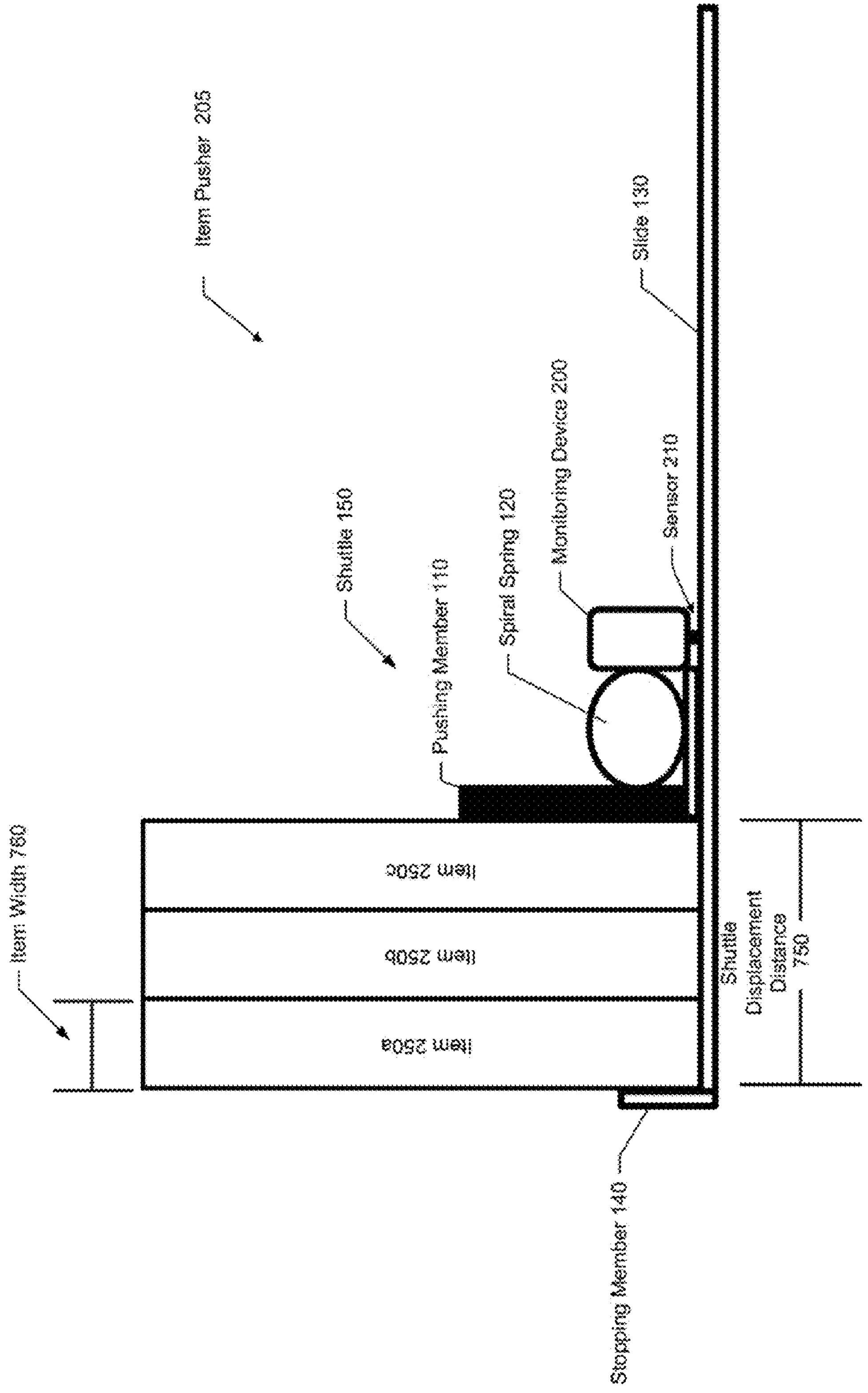
FIG. 2 is an illustration of an example item pusher with a monitoring device according to some example embodiments.

FIG. 2 illustrates an example embodiment of the present invention in the form of an item pusher 205 having a monitoring device 200. The item pusher 205 may include the components described with respect to item pusher 100, which may operate in the same or similar fashion, however, with the addition of the monitoring device 200. The monitoring, device 200 may be configured to monitor a state of a sensor 210 to determine a position of the shuttle 150 relative to the stopping member 140 along a defined movement path for the shuttle 150. As depicted in FIG. 2, the item pusher device 205 is stocked with items 250*a*, 250*b*, and 250*c*, which have been moved to the front of the item pusher device 500 by the force applied on the items by the pusher member 110 (as described with respect to FIG. 1). Because the items stocked in the item pusher 205 have the same dimensions, the monitoring device 200 can determine a number of items currently stocked in the item pusher using the item width 760 and the measured shuttle displacement distance 750. The monitoring device 201) may use the following relationship to determine the number of items currently stocked in the item pusher 205:

(Shuttle Displacement Distance)/(Item Width)=No. of Items in the Item Pusher

Figure 3:
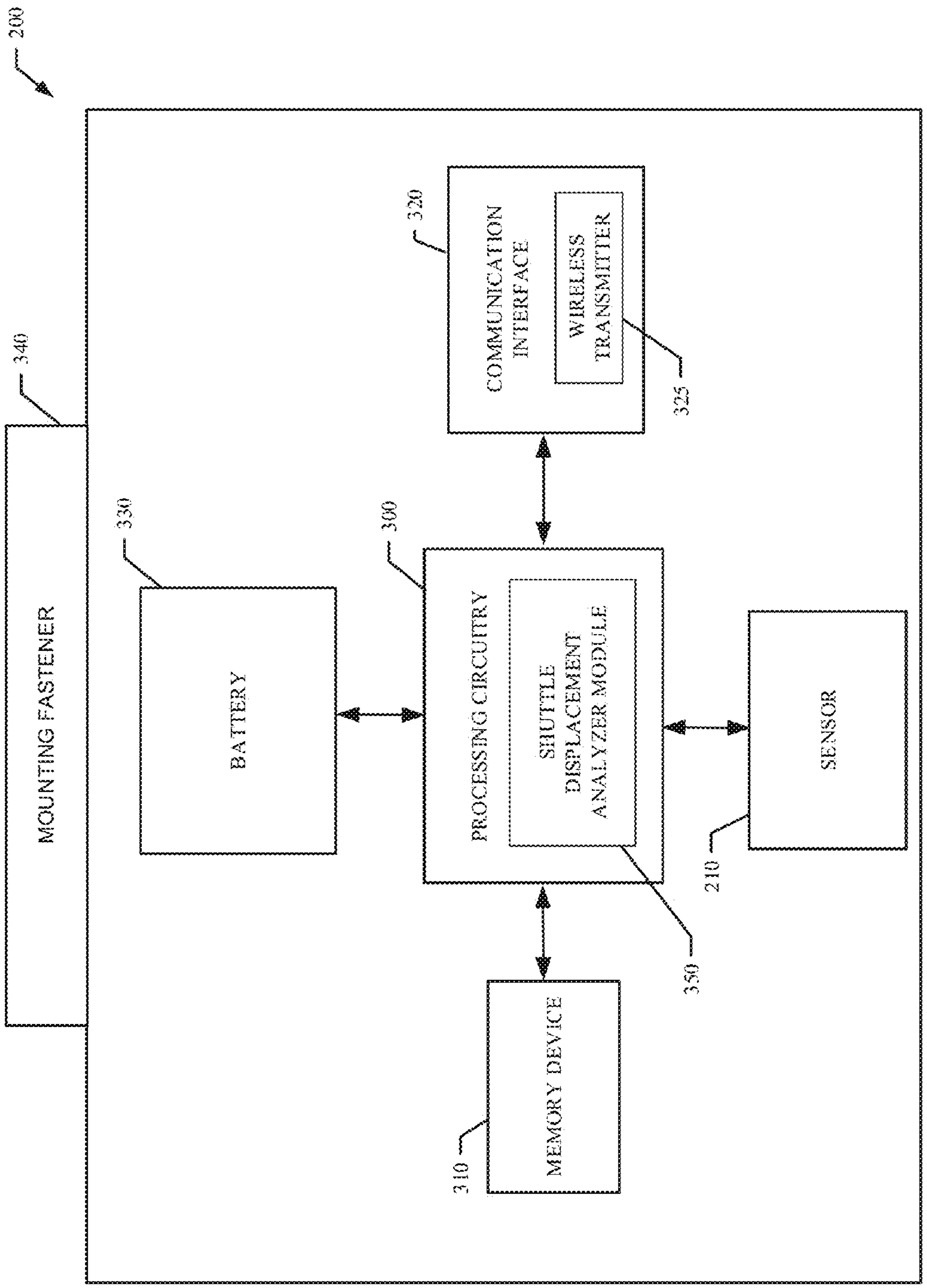
FIG. 3 is a functional block diagram of an example monitoring device according to some example embodiments.

The monitoring device 200 may be configured to perform various functionalities, such as, for example, detect movement of the shuttle 150 and use the movement information to determine sales or theft activity. Data representations or indications of the position and movement of the shuttle may be analyzed to enable a variety of responsive actions to be undertaken by the monitoring device 200 (e.g., report activity to a server, activate an alarm, send a notification to a mobile device, log the activity, etc.). According to some example embodiments, the monitoring device may include a wireless radio and transmitter 325 (see FIG.3) configured to transmit an indication of the position of the shuttle 150 to a server to thereby trigger a responsive action by the server (e.g., activate an alarm, send a notification to a mobile device, log the activity, etc.) According to some example embodiments, information about the position of the shuttle 150 may be provided in the form of a wirelessly transmitted status signal fir the monitoring device 200.

The monitoring device 200 may be embodied in a number of forms that sample the output of a sensor to determine a position of the shuffle 150 at a given time. FIG. 4 illustrates a block diagram of one type of monitoring device 200. As indicated above, the monitoring device 200 may be removably attached to, permanently attached to, or integrated into, for example, an item pusher device, such as the item pusher 205, and be configured to monitor the position of the shuttle 150 and report the position of the shuttle to a network (e.g., a wireless network).

The monitoring device 200 may comprise processing circuitry 300, a memory device 310, a communications interface 320, a battery 330, a mounting fastener 340, a sensor 210, and a shuttle displacement analyzer module 350. In some example embodiments, the monitoring device 200 may also include a user interface including a display device, an alarm, and controllable light elements (e.g., LEDs).

In an example embodiment, the processing circuitry 300 may be configured to control the operation of the monitoring device 200. The processing circuitry 300 may be embodied in a number of different ways. The processing circuitry 300 may include a clock, an arithmetic logic unit (ALU), and logic gates configured to support operation of a processor. The processing circuitry 300 may include one or more of various hardware processing devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processing circuitry 300 may be configured to execute instructions stored in memory device 310 or memory otherwise accessible to the processing circuitry 300. The program instructions may be permanent or non-volatile (e.g., firmware) or modifiable (e.g., software) instructions. Alternatively or additionally, the processing circuitry 300 may include hardware that is specifically configured to execute functionality, for example when embodied as an ASIC. Thus, when the processing circuitry 300 is in the form of configured hardware or hardware configured via the execution of software, the processing circuitry 300 is specifically configured hardware for performing the algorithms and/or operations described herein in association with the operation of the monitoring device 200.

The processing circuitry 300 may also include an input/output (I/O), which may include ports (or pins). According to some example embodiments, the I/O may be configured to interface with any number of external devices such as, electronic security devices, tamper detection components, merchandising displays, audio signal emitting devices (including alarms, speakers, piezo buzzers, etc.), microphones, lights (e.g., light emitting diodes (LEDs) including dual-color LEDs), buttons, keypads, monitors, displays that present human-readable information (e.g., for changeable pricing labels), sensors (e.g., accelerometers, movement sensors (e.g., motion detection switch), light sensors, temperature sensors), cameras, camera controls (e.g., configured to forward still pictures), store audio systems, customer counters, lighting switches, barcode scanners, RFID readers, loyalty card scanners, communications hardware (e.g., USB hardware, Ethernet hardware, RS232 hardware), and the like. AS such, the I/O of the processing circuitry 300 may be configured to support various functionality that the monitoring device 200 may be configured to perform. As another example, an I/O pin or port may interface with an LED to cause the LED to flash at a regular interval to provide a visual indication of a status of the monitoring device 200 and operate to attract the attention of store personnel or customers. For yet another example, an I/O pin or port may be configured to interface with a piezo buzzer or other audio device to emit various audible tones under the control of the processing circuitry 300.

The memory device 310 may include, for example, one or more volatile and/or non-volatile memories. In other words, for example, the memory device 44 may be a non-transitory computer readable storage device or medium comprising gates (e.g., logic gates) configured to store data (e.g., bits) that may be retrievable by a machine (e.g., a computing device such as a processor of processing circuitry 300). The memory device 310 may be configured to store information, data, applications, instructions, or the like for enabling monitoring device 200 to carry out various functions in accordance with example embodiments. For example, the memory device 310 may be configured to buffer input data for processing by the processing circuitry 300. Additionally or alternatively, the memory device 310 may be configured to store instructions for execution by the processing circuitry 300. In this regard, instructions stored on the memory device 310 may be specifically tailored to direct the operation of the monitoring device 200 via the processing circuitry 300.

The communications interface 320 may be any means such as a device or circuitry embodied in either hardware, or a combination of hardware and software that is configured to receive and/or transmit data from/to a network and/or any other device or module in wired or wireless communication with monitoring device 200. Communications interface 340 may include, for example, an antenna (or multiple antennas) and supporting hardware and/or software for enabling communications with a wireless network or other devices. In an example embodiment, the communications interface 320 may support communication via one or more different communication protocols or methods. In some examples, a radio transmitter/receiver may include a transmitter 325 and corresponding receiver configured to support radio frequency (RF) communication in accordance with an IEEE (Institute of Electrical and Electronics Engineers) communication standards such as IEEE 802.15, IEEE 802.15.4, or IEEE 802.15.4a, which may yield a relatively larger communication proximity area. For example, some embodiments may employ Bluetooth, Wibree, ultra-wideband (UWB), WirelessHART, MiWi or other communication standards employing relatively short range or near-field wireless communication in a network such as a wireless personal area network (WPAN). In some cases, IEEE 802.15.4 or 4a based communication techniques, ZigBee, or other low power, short range communication protocols such as a proprietary technique based on IEEE 802.15.4 may be employed. According to some example embodiments, the communications interface 320 may be configured to support an Internet Protocol version 6 (IPV6) stack. The communications interface 320 may also support a Route Under MAC (Media Access Control) (RUM) protocol or a modified RUM protocol. Regardless of the protocol, the communications interface 320 may be configured to utilize a network identifier or network key, example stored in the memory device 310, such as a personal area network (PAN) identifier. In some example embodiments, a monitoring device might not be permitted to communicate within network without using a matching network identifier or key.

The monitoring device 200 may also be powered by a battery 330 or the monitoring device 200 may be powered via a connection to a wired power source (e.g., mains powered). In some example embodiments, the operation of the monitoring device 200 may be controlled to minimize the power utilization and prolong battery life. Additionally, the monitoring device may include a mounting fastener 340 that is configured to permit the monitoring device 200 to be installed on, for example, the shuttle 150 or elsewhere on the item pusher 205.

The sensor 210 may be a device that responds to movement of the shuttle 150 by providing an output that indicates a position of the shuttle 150. According to some example embodiments, the sensor 210 may include a potentiometer with a member that is actuated and thereby changes resistance at the output of the potentiometer as the shuttle 150 is moved along a defined movement path. According to some example embodiments, the sensor 210 may include any type of device that provides a variable electrical output (e.g., voltage, current, etc.) having a value that bears a relationship to a physical position of, for example, a sensor pin. The processing circuitry 300 may be configured to receive the output signal of the sensor 210 (e.g., the output of the potentiometer) and translate the output signal into a shuttle displacement distance or a representation of the shuttle displacement distance for analysis or reporting.

FIG. 4*s* illustrates an example circuit diagram of the sensor 210, which may be driven and analyzed by the processing circuitry 300 to determine a position of the shuttle 150. In this regard, the processing circuitry 300 may drive the $V_{out}$ node 410 by applying a voltage at a given level (e.g., 3 volts). As illustrated, the voltage at $V_{out}$ is also applied across the potentiometer 430 and, due to movement of the shuttle 150, the resistance—and therefore the voltage—at the potentiometer output 435 may change in relation to the movement of the shuttle to provide an indication of the position of the shuttle 150. The example sensor circuit of FIG. 4*a* also includes a resistor 440 and a capacitor 450, which are included to facilitate detection of an output signal at the $V_{pot}$ node 420. The $V_{pot}$ node 420 may be electrically connected to the processing circuitry 300, and the processing circuitry 300 may be configured to, via the shuttle displacement analyzer module 350, analyze the signal at the node 420 and generate as representation of the position of the shuttle 150 based on the signal (e.g., the voltage level of the signal).

FIG. 4*b* illustrates example voltage waveforms that may be present on nodes 410 and 420. According to some example embodiments, rather than continuously applying a voltage to the $V_{out}$ node 410, the processing circuitry 300—via the shuttle displacement analyzer module 350—may be configured to reduce battery consumption by applying to voltage to the potentiometer 430 when a sample of the signal at the $V_{pot}$ node 420 is to be taken. An example scenario is provided in FIG. 4*b*. At 455, both $V_{out}$ and $V_{pot}$ are in a low state since no voltage is being applied by the processing circuitry 300. At 460, the processing circuitry 300 applies a voltage to $V_{out}$, which in turn, causes the voltage in $V_{pot}$ to increase. After a threshold waiting period, the signal at $V_{pot}$ may be at a stable level and a sample may be taken at 470 to determine a signal level 490, which is indicative of the position of the shuttle 150. Subsequent to taking the sample, the processing circuitry 300, via the shuttle displacement analyzer module 350, may be configured to remove the voltage to the potentiometer 430 at 480 to conserve battery life until the next sampling event. Sampling events may be performed at a regular interval or in response to a trigger, such as for example, actuation of a motion detection switch (e.g., jiggle switch, motion sensitive/actuated switch, motion or tilt sensor, a mercury switch, a gravity switch, as vibration switch, or the like). The output of the motion detection switch may indicate that movement of the shuttle has occurred. A motion detection switch may be any type of device that detects movement to jostling.

Reference is now made to FIGS. 5*a*-5*c*, which describe an example embodiment for actuating a channel engagement member (e.g., sensor pin 215) of the sensor 210 using a channel 510 that is oriented nonparallel to a defined movement path of the shuttle 150 in at least one plane. According to some example embodiments, the channel 510 and the defined movement path are nonparallel in at least one plane. In this regard, the channel engagement member may be configured to at least physically interface with the channel 510 as the sensor pin 215. The channel 510 may be defined such that movement of the shuttle along the defined movement path causes movement of the sensor pin in a direction that is nonparallel to the defined movement path. It is understood that while some example embodiments described herein refer to the use of as sensor pin for engaging the channel other types of channel engagement members may also be use (e.g., wheels, T-shaped member, ball, gear, etc.) Accordingly, in some example embodiments, the channel engagement member and sensor may include hardware to translate lateral or rotational movement of the channel engagement member into a modified electrical output (voltage, current, etc.).

FIGS. 5*a*-5*c* provide a perspective view of the item pusher 205 from above. In the example embodiments described in FIGS. 5*a*-5*c*, the sensor 210 includes a sensor pin 215 that is affixed to the shuttle 150. According to some example embodiments, the sensor pin 215 may be, or be physically affixed or connected to, a slidable control of a slide potentiometer. The sensor pin 215 may therefore be configured to control the output of a potentiometer. A slide potentiometer may be a device that modifies (i.e., increases or decreases) an output resistance as a pin of the potentiometer is slid across the device (i.e., linear motion). While the example embodiments depicted in FIGS. 5*a*-5*e* utilize a slide potentiometer, it is contemplated that a turn potentiometer could alternatively used where a hinged pair of linkages translate linear movement of a pin within the channel 510 into rotational movement to as control of a turn potentiometer.

The item pusher 205 includes as channel 510 that is disposed on a channel surface 500 where, in this example embodiment, the channel surface 500 is the top surface of the slide 130. As such, the slide 130 may include the channel surface 500 and the channel 510. It is noteworthy that the channel surface 500 including the channel 510 may be oriented in a number of positions relative to the shuttle 150 such as, for example, on a side of the shuttle 150 where the pin 215 may have a component of movement in an upwards or downwards direction as the shuttle 150 moves along the defined movement path towards or away from the stopping member 140. The channel 510 in FIGS. 5*a*-5*c* is depicted as being linear. However, according to some example embodiments, the channel 510 may be non-linear, such as for example, an exponential channel, a channel in the form of a sine wave, a piecewise linear channel, or the like, in example embodiments where a non-linear channel is used, the relationship between the output resistance of at potentiometer and the movement of the shuttle 150 may be a non-linear relationship. However, if a potentiometer is used that has a non-linear output characteristic, then as non-linear channel may result in the position of the shuttle 150 and the output of the potentiometer having a linear relationship.

As depicted in FIGS. 5*a*-5*c* the defined movement path for the shuttle 150—in this example embodiment due to the operation of the tracks 160—is oriented along a line from a rear or back of the channel surface 500 to a front of the channel surface 500 where the stopping member 140 is disposed. The orientation of the channel 510 may be non-parallel to the defined movement path of the shuttle 150. As depicted in FIGS. 5*a*-5*c* the channel 510 is oriented diagonal to the defined movement path for the shuttle 150. The sequence of FIGS. 5*a*-5*c* illustrates the movement of the pin 215 within the channel 510 as the shuttle 150 moves along the defined movement path, in this case from the rear of the channel surface 500 to the front of the channel surface 500. FIG. 5*a* illustrates the pin 215 in a position on the right side of sensor 210 when the shuttle 150 is located in the rear of the channel surface 500. As the shuttle 150 moves forward towards the stopping member 140, the nonparallel orientation of the channel 510 relative to the defined movement path of the shuttle 150 causes the pin 215 to more towards as central position as depicted in FIG 5*b*. Finally, in FIG. 5*c*, the shuttle 150 has moved forward to the stopping member 140, which has caused the pin 215 to move to a left side of the sensor 210. As such, the motion of the shuttle 150 is translated into motion of the pin 215 within the channel 510, to thereby cause a potentiometer to change an output resistance in a manner relative to the motion of the shuttle 150. The monitoring device 200 may be configured, as describe above and otherwise herein, to monitor the output of a potentiometer and translate a signal on the output of the potentiometer into an indication of the position of the shuffle 150.

Referring again to FIG. 3, the shuttle displacement analyzer module 350 of the monitoring device 200, which may be embodied in hardware (e.g., an ASIC) or software (e.g., when for example, a processor of the processing circuitry 300 is a processor that executes instructions stored on memory device 310), and may be configured to manage and direct the processing circuitry 300 to perform functions consistent with the various functionalities of the monitoring device 200 described herein, including the analysis of the output of the sensor 210. The processing circuitry 300 of an example embodiment may be embodied as, include or otherwise control, the shuttle displacement analyzer module 350. The shuttle displacement analyzer module 350 may be implemented by any means, such as a device or circuitry operating in accordance with firmware/software or otherwise embodied in hardware or a combination of hardware and firmware/software (e.g., processing circuitry operating under software control, the processing circuitry including or embodied as an ASIC or FPGA specifically configured to perform the operations described herein, or a combination thereof), thereby configuring the device of circuitry to perform the corresponding functions of the shuttle displacement analyzer module 350, as described herein. Thus, in examples in which software is employed, a device or circuitry (e.g., the processing circuitry 300 in one example) executing the software algorithms described herein forms a structure associated with such means.

In this regard, with reference to the flowchart of FIG. 6, the shuttle displacement analyzer module 350 may be configured to receive, at 600, a sensor signal from an output of a sensor (e.g., sensor 210) where the sensor signal is indicative of a position of a sensor pin, and determine, at 610, the position of the sensor pin that is affixed to a shuffle. The shuttle may be movable and configured to at least exert a force on an item to urge the item towards a stopping member. The sensor signal may be indicative of the actual, physical location, or the sensor signal may be indicative of a change of state or relative location. The sensor pin may be configured to at least physically interface with a channel, where the channel is defined such that movement of the shuttle along a defined movement path causes movement of the sensor pin in a direction that is nonparallel to the defined movement path.

Additionally or alternatively, the shuttle displacement analyzer module 350 may be configured to cause a transmitter to transmit an indication of a position of the sensor pin by a wireless transmitter affixed to the shuttle. According to some example embodiments, the shuttle displacement analyzer module 350 may be additionally or alternatively configured to determine a number of items stocked in the item pusher based on the position (if the sensor pin and a known width of a single item that is stocked in the item pusher. Additionally or alternatively, according to some example embodiments, the shuttle displacement analyzer module 350 may be configured to translate the sensor pin position into a shuttle position. According to some example embodiments, the shuttle displacement analyzer module 350 may be additionally or alternatively configured to determine the position of the sensor pin in response to detecting movement of the shuttle. In this regard, according to some example embodiments, movement of the shuttle may be detected via an output or a motion detection switch. Additionally or alternatively, the shuttle displacement analyzer module 350 may be configured to apply an input voltage to an input of a potentiometer (e.g., apply a voltage to node 410 of FIG. 4*a*) in response to detecting movement of the shuttle, sample an output voltage indicative of a resistance of the potentiometer, and remove the input voltage to the input of the potentiometer.

Embodiments of the present invention may be implemented by various means, such as hardware, firmware, processor, circuitry and/or other device associated with execution of software including one or more computer program instructions. For example, one or more of the procedures or activities described above (such as those described with respect to the flowchart of FIG. 6) may be embodied by computer program instructions. In this regard, the computer program instructions which embody the procedures or activities described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the corresponding procedure or activity. These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the corresponding procedure or activity. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the corresponding procedure or activity described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this disclosure. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of this disclosure. In this regard, for example, different combinations of elements and/or functions than those explicitly described above are also contemplated as may be set forth in some of this disclosure. Although specific terms are employed herein, they are used in a generic and descriptive sense only and not for purposes of limitation.

What is claimed is:

1. An item pusher comprising:

a shuttle movable toward a stopping member along a defined movement path and configured to at least exert a force on an item stocked within the item pusher to urge the item toward the stopping member;

a channel surface including a channel; and a channel engagement member affixed to the shuttle, the channel engagement member configured to slidably engage with the channel;

wherein the channel is defined diagonal to the defined movement path such that movement of the shuttle along the defined movement path causes linear movement of the channel engagement member in a direction that is nonparallel to the defined movement path in at least one plane.

2. The item pusher of claim 1 further comprising a monitoring device configured to detect a position of the channel engagement member and determine a number of items stocked in the item pusher based on the position of the channel engagement member.

3. The item pusher of claim 1 further comprising a potentiometer, wherein the channel engagement member is affixed to the potentiometer and configured to change resistance at an output of the potentiometer as the shuttle moves linearly along the defined movement path.

4. The item pusher of claim 1 further comprising a slide configured to at least guide the shuttle along the defined movement path, wherein the slide includes the channel surface and the channel.

5. The item pusher of claim 1, wherein the channel is linear.

6. The item pusher of claim 1 further comprising a monitoring device configured to at least determine a channel engagement member position and translate the channel engagement member position into a shuttle position.

7. The item pusher of claim 1 further comprising a monitoring device configured to at least determine a channel engagement member position in response to detecting movement of the shuttle.

8. The item pusher of claim 1 further comprising a monitoring device configured to at least: apply an input voltage to an input of a potentiometer in response to detecting movement of the shuttle; sample an output voltage indicative of a resistance of the potentiometer; and remove the input voltage to the input of the potentiometer.

9. The item pusher of claim 1 further comprising a monitoring device configured to at least determine a channel engagement member position in response to detecting movement of the shuttle via an output of a motion detection switch.

10. The item pusher of claim 2, wherein the monitoring device is affixed to the shuttle.

11. The item pusher of claim 2, wherein the monitoring device comprises a wireless transmitter, the wireless transmitter being configured to at least transmit an indication of a position of the channel engagement member.

12. The item pusher of claim 1 further comprising a monitoring device configured to at least determine a channel engagement member position.

13. The item pusher of claim 1 further comprising a monitoring device configured to at least determine a channel engagement member position indicating that a threshold number of items have been removed from the item pusher within a threshold amount of time.

14. The item pusher of claim 1 further comprising a monitoring device configured to at least determine a channel engagement member position and, based on the channel engagement member position, report item pusher activity to a server.

15. The item pusher of claim 1 further comprising a monitoring device configured to at least determine a channel engagement member position and, based on the channel engagement member position, activate an alarm.

16. The item pusher of claim 1 further comprising a monitoring device configured to at least determine a channel engagement member position and, based on the channel engagement member position, send a notification to a mobile device.

17. The item pusher of claim 1 further comprising a monitoring device configured to at least determine a channel engagement member position and, based on the channel engagement member position, log an activity.

18. The item pusher of claim 1 further comprising a monitoring device configured to at least determine a channel engagement member position, the monitoring device comprising a display device.

19. The item pusher of claim 1 further comprising a monitoring device configured to at least determine a channel engagement member position, the monitoring device comprising an alarm.

20. The item pusher of claim 1 further comprising a monitoring device configured to at least determine a channel engagement member position, the monitoring device comprising controllable light elements.

* * * * *